(12) United States Patent
Pedersen et al.

(10) Patent No.: US 9,887,848 B2
(45) Date of Patent: Feb. 6, 2018

(54) CLIENT DEVICE WITH CERTIFICATE AND RELATED METHOD

(71) Applicant: GN Hearing A/S, Ballerup (DK)

(72) Inventors: Brian Dam Pedersen, Ringsted (DK); Allan Munk Vendelbo, Valby (DK)

(73) Assignee: GN Hearing A/S, Ballerup (DK)

( * ) Notice: Subject to any disclaimer, the term of this patent is extended or adjusted under 35 U.S.C. 154(b) by 0 days.

(21) Appl. No.: 14/799,402

(22) Filed: Jul. 14, 2015

(65) Prior Publication Data
US 2017/0005810 A1    Jan. 5, 2017

(30) Foreign Application Priority Data

Jul. 2, 2015   (DK) .................................. 2015 70435
Jul. 2, 2015   (EP) .................................... 15175139

(51) Int. Cl.
*H04L 29/06*     (2006.01)
*H04L 9/32*      (2006.01)
(Continued)

(52) U.S. Cl.
CPC .......... *H04L 9/3268* (2013.01); *H04L 9/0861* (2013.01); *H04L 9/0866* (2013.01);
(Continued)

(58) Field of Classification Search
CPC .... H04L 9/3263; H04L 63/0823; G06F 21/33
See application file for complete search history.

(56) References Cited

U.S. PATENT DOCUMENTS 5,757,920 A    5/1998  Misra et al.
5,809,140 A    9/1998  Rubin et al.
(Continued)

FOREIGN PATENT DOCUMENTS

DE    102 00 796 A1    7/2003
DK    2013 70266 A1    11/2014
(Continued)

OTHER PUBLICATIONS

First Technical Examination and Search Report dated Feb. 25, 2016 for related Danish Patent Application No. PA 2015 70438.
(Continued)

*Primary Examiner* — Jason K Gee
(74) *Attorney, Agent, or Firm* — Vista IP Law Group, LLP

(57) ABSTRACT

A client device for hearing device communication, includes: a processing unit; a memory unit; and an interface; wherein the memory unit has a client device key and a client device certificate stored therein; and wherein the processing unit is configured to receive a connection response comprising a hearing device identifier via the interface, generate one or more keys including a certificate key based on the hearing device identifier and the client device key, and obtain an authentication message based on the certificate key and the client device certificate; wherein the processing unit is configured to obtain the authentication message by encrypting the client device certificate with the certificate key to obtain an encrypted client device certificate, and including the encrypted client device certificate in the authentication message; and wherein the interface is configured to transmit the authentication message.

10 Claims, 9 Drawing Sheets

(51) Int. Cl.
　　　*H04L 9/08* (2006.01)
　　　*H04W 12/04* (2009.01)
(52) U.S. Cl.
　　　CPC ............ *H04L 9/321* (2013.01); *H04L 9/3242* (2013.01); *H04L 63/062* (2013.01); *H04W 12/04* (2013.01)

(56) References Cited

U.S. PATENT DOCUMENTS

| | | | |
|---|---|---|---|
| 6,055,575 | A | 4/2000 | Paulsen |
| 6,556,686 | B1 | 4/2003 | Weidner |
| 6,658,307 | B1 | 12/2003 | Mueller |
| 6,724,862 | B1 | 4/2004 | Shaffer |
| 8,670,355 | B1 | 3/2014 | Frerking |
| 8,812,851 | B2 | 8/2014 | Schwarz |
| 9,219,966 | B2 | 12/2015 | Wang |
| 9,402,179 | B1 | 7/2016 | Miller |
| 9,608,807 | B2 | 3/2017 | Pedersen et al. |
| 2002/0054689 | A1 | 5/2002 | Zhang et al. |
| 2002/0169717 | A1 | 11/2002 | Challener |
| 2002/0196159 | A1 | 12/2002 | Lesenne et al. |
| 2004/0071304 | A1 | 4/2004 | Yanz |
| 2004/0117650 | A1 | 6/2004 | Karaoguz et al. |
| 2004/0117818 | A1 | 6/2004 | Karaoguz et al. |
| 2004/0125958 | A1 | 7/2004 | Brewster |
| 2004/0162980 | A1 | 8/2004 | Lesenne et al. |
| 2005/0154889 | A1 | 7/2005 | Ashley et al. |
| 2006/0005237 | A1 | 1/2006 | Kobata et al. |
| 2007/0078866 | A1 | 4/2007 | Takashima |
| 2008/0049957 | A1 | 2/2008 | Topholm |
| 2009/0210699 | A1 | 8/2009 | Grewal et al. |
| 2010/0067711 | A1 | 3/2010 | Waldmann |
| 2010/0104122 | A1 | 4/2010 | Waldmann |
| 2010/0205447 | A1 | 8/2010 | Waldmann |
| 2010/0290627 | A1 | 11/2010 | Tsuji et al. |
| 2010/0306525 | A1 | 12/2010 | Ferguson |
| 2011/0188684 | A1 | 8/2011 | Spieler et al. |
| 2011/0293124 | A1 | 12/2011 | Ma |
| 2012/0036364 | A1 | 2/2012 | Yoneda et al. |
| 2012/0140962 | A1 | 6/2012 | Ubezio et al. |
| 2012/0252411 | A1 | 10/2012 | Johnsgard et al. |
| 2012/0252531 | A1 | 10/2012 | King |
| 2013/0024798 | A1 | 1/2013 | Schneider |
| 2013/0077791 | A1 | 3/2013 | Kozuka et al. |
| 2013/0177188 | A1 | 7/2013 | Apfel |
| 2013/0177189 | A1 | 7/2013 | Bryant |
| 2013/0202138 | A1 | 8/2013 | Nishizaki et al. |
| 2013/0251179 | A1 | 9/2013 | Aschoff |
| 2013/0257364 | A1 | 10/2013 | Redding |
| 2013/0290733 | A1 | 10/2013 | Branton et al. |
| 2013/0290734 | A1 | 10/2013 | Branton et al. |
| 2013/0329924 | A1 | 12/2013 | Fleizach |
| 2014/0004825 | A1 | 1/2014 | Prakash |
| 2014/0050341 | A1 | 2/2014 | Flynn |
| 2014/0193008 | A1 | 7/2014 | Zukic |
| 2014/0211973 | A1* | 7/2014 | Wang ............... H04W 4/02 381/315 |
| 2014/0289516 | A1* | 9/2014 | Sahay ............... H04L 9/3263 713/162 |
| 2014/0331064 | A1 | 11/2014 | Ballesteros |
| 2014/0334629 | A1 | 11/2014 | Andersen et al. |
| 2014/0341405 | A1* | 11/2014 | Pedersen ............ H04R 25/554 381/315 |
| 2015/0023512 | A1 | 1/2015 | Shennib |
| 2015/0023534 | A1 | 1/2015 | Shennib |
| 2015/0289062 | A1 | 10/2015 | Ungstrup |
| 2016/0142838 | A1 | 5/2016 | Thomsen |
| 2016/0198271 | A1 | 7/2016 | Shennib |
| 2016/0255448 | A1 | 9/2016 | Morant |
| 2016/0337769 | A1 | 11/2016 | Siddhartha |
| 2017/0099550 | A1 | 4/2017 | Blessing |
| 2017/0180886 | A1 | 6/2017 | Van Der Loo |
| 2017/0286918 | A1 | 10/2017 | Westermann |

FOREIGN PATENT DOCUMENTS

| | | |
|---|---|---|
| EP | 1 582 958 A2 | 10/2005 |
| EP | 2 760 225 A1 | 7/2014 |
| EP | 2 928 212 A1 | 10/2015 |
| WO | WO 2007/098605 A1 | 9/2007 |
| WO | WO 2007/144435 A2 | 12/2007 |
| WO | WO 2007/144435 A3 | 12/2007 |
| WO | WO 2013/091693 A1 | 6/2013 |
| WO | WO 2014/094866 A1 | 6/2014 |
| WO | WO 2016/078711 | 5/2016 |
| WO | WO 2016/096011 | 6/2016 |

OTHER PUBLICATIONS

Extended European Search Report dated Nov. 20, 2015 for related EP Patent Application No. 15175137.7.
Extended European Search Report dated Dec. 14, 2015 for related EP Patent Application No. 15175135.1.
Joann Spera, "SSL client authentication: It's a matter of trust", Mar. 2, 1998.
Li Wei, "Improvement Method of SSL Protocol Identity Authentication based on the Attribute Certificate", 2012 International Conference on Computer Science and Service System, IEEE Computer Society, Aug. 11, 2012.
Extended European Search Report dated Jan. 4, 2016 for related EP Patent Application No. 151751378.5.
John Padgette, et al., "Guide to Bluetooth Security Recommendations of the National Institute of Standards and Technology", Jun. 2012.
"Link Manager Protocol Specification , 4 Procedure Rules, 4.1 Connection Control, 4.2 Security" In: Bluetooth Specification v4.0, Core System Package,Bluetooth.com, vol. 2, Jun. 30, 2010.
"Message Sequence Charts, 4 Optional Activities After ACL Connection Establishment, 4.2 Simple Pairing Message Sequence Charts" In: Bluetooth Specification v4.0, Core System Package, Bluetooth.com, vol. 2, Jun. 30, 2010.
"Security Specification" In: Bluetooth Specification v4.0, Core System Package, Bluetooth.com, vol. 2, Jun. 30, 2010.
Extended European Search Report dated Dec. 14, 2015 for related EP Patent Application No. 15175141.9.
Vincent Bernat: "Speeding up SSL: enabling session reuse", Sep. 27, 2011.
Extended European Search Report dated Dec. 23, 2015 for related EP Patent Application No. 15175139.3.
Leicher A et al., "Implementation of a Trusted Ticket System", Emerging Challenges for Security, Privacy and Trust. IFIP Advances in Information and Communication Technology, vol. 297, Jan. 1, 2009.
First Technical Examination and Search Report dated Jan. 25, 2016 for related Danish Patent Application No. PA 2015 70437, 5 pages.
Extended European Search Report dated Jan. 11, 2016 for related EP Patent Application No. 15175142.7, 10 pages.
Gary C. Kessler, "An Overview of Cryptography", Nov. 17, 2006.
Menezes et al., "Handbook of Applied Cryptography, Key Management Techniques", Jan. 1, 1997.
First Technical Examination and Search Report dated Feb. 23, 2016 for corresponding Danish Patent Application No. PA 2015 70435, 5 pages.
Extended European Search Report dated Jan. 12, 2016 for related EP Patent Application No. 15175140.1, 8 pages.
First Technical Examination and Search Report dated Feb. 25, 2016 for related Danish Patent Application No. PA 2015 70436.
First Technical Examination and Search Report dated Feb. 25, 2016 for related Danish Patent Application No. PA 2015 70434.
First Technical Examination and Search Report dated Feb. 22, 2016 for related Danish Patent Application No. PA 2015 70432.
First Technical Examination and Search Report dated Feb. 29, 2016 for related Danish Patent Application No. PA 2015 70433.
Notice of Allowance and Fees Due dated Jan. 19, 2017 for related U.S. Appl. No. 14/793,466.
Non-final Office Action dated Sep. 22, 2016 for related U.S. Appl. No. 14/793,515.

(56) References Cited

OTHER PUBLICATIONS

Non-final Office Action dated Sep. 30, 2016 for related U.S. Appl. No. 14/799,437.
Non-final Office action dated Oct. 7, 2016 for related U.S. Appl. No. 14/793,587.
Non-final Office Action dated Feb. 10, 2017 for related U.S. Appl. No. 14/799,463.
Final Office Action dated Mar. 9, 2017 for U.S. Appl. No. 14/793 515.
Second Technical Examination and Search Report dated Apr. 5, 2017 for related Danish Patent Application No. PA 2015 70432, 3 pages.
Notice of Allowance and Fees Due dated May 18, 2017 for related U.S. Appl. No. 14/799,338.
Final Office Action dated May 12, 2017 for related U.S. Appl. No. 14/793,587.
Final Office Action dated May 30, 2017 for related U.S. Appl. No. 14/799,437.
Advisory Action dated Jun. 22, 2017 for related U.S. Appl. No. 14/793,515.
Notice of Allowance and Fee(s) due dated Jun. 23, 2017 for related U.S. Appl. No. 14/799,463.
Non-final Office Action dated Jul. 20, 2017 for related U.S. Appl. No. 15/595,526.
Non-final Office Action dated Jul. 21, 2017 for related U.S. Appl. No. 15/623,266.
Non-final Office Action dated Aug. 14, 2017 for related U.S. Appl. No. 14/793,515.
Notice of Allowance and Fee(s) dated Aug. 24, 2017 for related U.S. Appl. No. 14/799,463.
Notice of Allowance and Fee(s) dated Sep. 13, 2017 for related U.S. Appl. No. 14/799,338.
Non-final Office Action dated Sep. 27, 2017 for related U.S. Appl. No. 15/697,406.
Advisory Action dated Oct. 23, 2017 for related U.S. Appl. No. 14/799,437.
Advisory Action dated Nov. 16, 2017 for related U.S. Appl. No. 14/793,587.
Notice of Allowance and Fee(s) due dated Nov. 3, 2017 for related U.S. Appl. No. 15/595,526.

* cited by examiner

CLIENT DEVICE WITH CERTIFICATE AND RELATED METHOD

RELATED APPLICATION DATA

This application claims priority to and the benefit of Danish Patent Application No. PA 2015 70435 filed on Jul. 2, 2015, pending, and European Patent Application No. 15175139.3 filed on Jul. 2, 2015, pending. The entire disclosures of the above applications are expressly incorporated by reference herein.

FIELD

The present disclosure relates to a client device for hearing device communication and related method. In particular, a method of operating a client device for hearing device communication is disclosed.

BACKGROUND

Functionalities of a hearing device become increasingly advanced. Wireless communication between a hearing device and external devices, such as hearing device fitting apparatus, tablets, smart phones and remote controllers, has evolved. A wireless communication interface of a hearing device uses an open standard-based interface. However, this poses many challenges in terms of security. A hearing device may assume any incoming data as legitimate, and may allow memory to be written or changed by an unauthorized party. Any such attacks may result in a malfunction of the hearing aid, or a battery exhaustion attack.

SUMMARY

There is a need for client device and method providing improved security for hearing device communication. Further, there is a need for devices and methods reducing the risk of a hearing aid and hearing aid function being compromised by a third party.

Disclosed is a client device for hearing device communication. The client device comprises a processing unit, a memory unit and an interface. The memory unit has a client device key, such as at least one client device key, and/or a client device certificate stored thereon. The processing unit is configured to receive a connection response, e.g. comprising a hearing device identifier, via the interface; generate one or more keys, e.g. including a certificate key, based on the hearing device identifier and/or the client device key; obtain an authentication message based on the certificate key and/or the client device certificate. To obtain the authentication message optionally comprises to generate and/or obtain an encrypted client device certificate by encrypting the client device certificate, e.g. with the certificate key, and optionally to include the encrypted client device certificate in the authentication message. The processing unit is configured to transmit the authentication message via the interface.

Further disclosed is a method of operating a client device for hearing device communication, the client device comprising a memory unit having a client device key, such as at least one client device key, and/or a client device certificate stored thereon. The method comprises receiving a connection response, e.g. comprising a hearing device identifier via the interface; generating one or more keys, e.g. including a certificate key, based on the hearing device identifier and/or the client device key; and obtaining an authentication message based on the certificate key and/or the client device certificate. Obtaining the authentication message optionally comprises generating an encrypted client device certificate, e.g. by encrypting the client device certificate with the certificate key, and optionally including the encrypted client device certificate in the authentication message. The method comprises transmitting the authentication message via the interface.

Advantageously, the method and hearing device enables the hearing device manufacturer to control client device access to the hearing device and/or enable version control in client device access.

The method and apparatus as disclosed provide a scalable security architecture for hearing device systems with improved security. The disclosed client device and method support a hearing device in combating attacks such as unauthorized access or control of a hearing device, while still allowing access to legitimate parties such as the client device, for e.g. fitting purposes, update purposes, maintenance purposes. The client device and method allow the hearing device to open a session only with authenticated parties, such as an authenticated fitting device, an authenticated accessory device, an authenticated external device and/or an authenticated server. This may provide robustness against impersonation and masquerading attacks, battery exhaustion attacks, eavesdropping, man-in-the-middle attacks and/or replay attacks. Further, the need for updating and/or exchange of keys in case a key has been compromised at a client device has been reduced and simplified.

A client device for hearing device communication, includes: a processing unit; a memory unit; and an interface; wherein the memory unit has a client device key and a client device certificate stored therein; and wherein the processing unit is configured to receive a connection response comprising a hearing device identifier via the interface, generate one or more keys including a certificate key based on the hearing device identifier and the client device key, and obtain an authentication message based on the certificate key and the client device certificate; wherein the processing unit is configured to obtain the authentication message by encrypting the client device certificate with the certificate key to obtain an encrypted client device certificate, and including the encrypted client device certificate in the authentication message; and wherein the interface is configured to transmit the authentication message.

Optionally, the one or more keys comprise a hearing device key; wherein the processing unit is configured to obtain a session identifier; wherein the processing unit is configured to generate the hearing device key based on the hearing device identifier and the client device key; and wherein the processing unit is configured to generate a common secret based on the hearing device key and the session identifier.

Optionally, the certificate key is based on the common secret and a certificate value.

Optionally, the one or more keys comprise a session key; wherein the processing unit is configured to generate the session key based on the hearing device identifier, the session identifier, and the client device key; and wherein the interface is configured to transmit the session key to a fitting device.

Optionally, the session key is based on the common secret and a session value.

Optionally, the processing unit is configured to include an authentication key identifier indicative of the client device key in the authentication message Optionally, the processing unit is configured to include an authentication type identifier in the authentication message.

Optionally, the client device certificate comprises: a certificate type identifier, a signing device identifier, a client device type identifier, a client device identifier, a client device key identifier, one or more hardware identifiers, a digital signature, or any combination of the foregoing.

A method of operating a client device for hearing device communication, the client device comprising a memory unit having a client device key and a client device certificate stored therein, includes: receiving a connection response comprising a hearing device identifier via an interface; generating one or more keys including a certificate key based on the hearing device identifier and the client device key; obtaining an authentication message based on the certificate key and the client device certificate, wherein the act of obtaining the authentication message comprises generating an encrypted client device certificate by encrypting the client device certificate with the certificate key, and including the encrypted client device certificate in the authentication message; and transmitting the authentication message via the interface.

Optionally, the method further includes obtaining a session identifier; wherein the act of generating the one or more keys comprises generating a hearing device key based on the hearing device identifier and the client device key, and generating a common secret based on the hearing device key and the session identifier.

Other features, advantageous, and/or embodiments will be described below in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
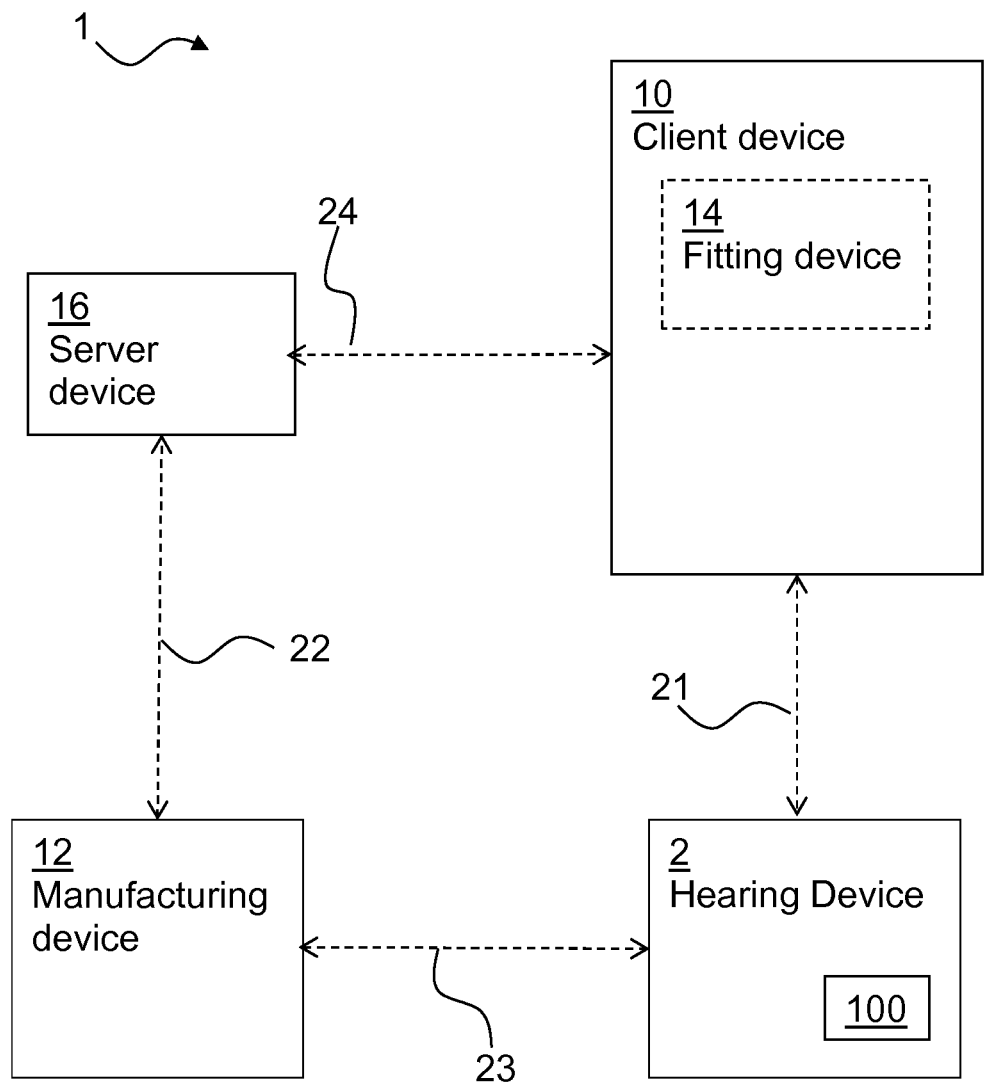
FIG. 1 schematically illustrates an exemplary architecture according to this disclosure, FIG. 2 schematically illustrates an exemplary client device, FIG. 3 schematically illustrates an exemplary client device certificate FIG. 4 schematically illustrates an exemplary client device certificate, FIG. 5 schematically illustrates an exemplary signalling diagram, FIG. 6 schematically illustrates an exemplary signalling diagram, FIG. 7 schematically illustrates an exemplary signalling diagram, FIG. 8 schematically illustrates a flowchart of an exemplary method, and FIG. 9 schematically illustrates an exemplary signalling diagram.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The present disclosure relates to improved security in hearing device communication. —Namely, the client device disclosed herein enables hearing device communication that is robust against security threats, vulnerabilities and attacks by implementing appropriate safeguards and countermeasures, such as security mechanisms, to protect against threats and attacks. The present disclosure relates to hearing device communication that is robust against replay attacks, unauthorized access, battery exhaustion attacks, and man-in-the-middle attacks.

As used herein, the term "hearing device" refers to a device configured to assist a user in hearing a sound, such as a hearing instrument, a hearing aid device, a headset, a pair of headphones, etc.

As used herein, the term "certificate" refers to a data structure that enables verification of its origin and content, such as verifying the legitimacy and/or authenticity of its origin and content. The certificate is configured to provide a content that is associated to a holder of the certificate by an issuer of the certificate. The certificate comprises a digital signature, so that a recipient of the certificate is able to verify or authenticate the certificate content and origin. The certificate may comprise one or more identifiers and/or keying material, such as one or more cryptographic keys (e.g. a hearing device key) enabling secure communication in a hearing device system. The certificate permits thus to achieve authentication of origin and content, non-repudiation, and/or integrity protection. The certificate may further comprise a validity period, one or more algorithm parameters, and/or an issuer. A certificate may comprise a digital certificate, a public key certificate, an attribute certificate, and/or an authorization certificate. Examples of certificates are X.509 certificates, and Secure/Multipurpose Internet Mail Extensions, S/MIME, certificates, and/or Transport Layer Security, TLS, certificates.

As used herein, the term "key" refers to a cryptographic key, i.e. a piece of data, (e.g. a string, a parameter) that determines a functional output of a cryptographic algorithm. For example, during encryption, the key allows a transformation of a plaintext into a cipher-text and vice versa during decryption. The key may also be used to verify a digital signature and/or a message authentication code, MAC. A key is so called a symmetric key when the same key is used for both encryption and decryption. In asymmetric cryptography or public key cryptography, a keying material is a key pair, so called a private-public key pair comprising a public key and a private key. In an asymmetric or public key cryptosystem (such as Rivest Shamir Adelman, RSA, cryptosystem), the public key is used for encryption and/or signature verification while the private key is used for decryption and/or signature generation. The hearing device key may be keying material allowing derivation of one or more symmetric keys, such as a session key and/or a certificate key for hearing device communication. The hearing device key may be stored in a memory unit of the hearing device, e.g. during manufacture. The hearing device key may comprise keying material that is used to derive a symmetric key. The hearing device key comprises for example an Advanced Encryption Standard, AES, key, such as an AES-128 bits key.

As used herein the term "identifier" refers to a piece of data that is used for identifying, such as for categorizing, and/or uniquely identifying. The identifier may be in a form of a word, a number, a letter, a symbol, a list, an array or any combination thereof. For example, the identifier as a number may be in the form of an integer, such as unsigned integer, uint, with a length of e.g. 8 bits, 16 bits, 32 bits, etc., such as an array of unsigned integers.

A client device for hearing device communication with a hearing device is disclosed. The term "client device" as used herein refers to a device that is able to communicate with the hearing device. The client device may refer to a computing device acting as a client. The client device may comprise a fitting device, a handheld device, a relay, a tablet, a personal computer, a mobile phone, an application running on a personal computer or tablet, or mobile phone and/or USB dongle plugged into a personal computer. The client device may be attributed a client device type indicated by a client device type identifier, the client device type e.g. corresponding to a model, category or type of client devices, such as a fitting type, e.g. a tablet product model, category or type for fitting the hearing device, a USB dongle product model, category or type for fitting the hearing device. The client device may be configured to control operation of the hearing device, either by sending fitting data, hearing device operating parameters, and/or firmware data.

The client device comprises a memory unit and an interface respectively connected to the processing unit. The memory unit may include removable and non-removable data storage units including, but not limited to, Read Only Memory (ROM), Random Access Memory (RAM), etc. The memory unit has a client device certificate stored thereon. The memory unit may have the client device certificate and/or the client device key stored at a memory address of the memory unit, and/or in memory cells of the memory unit, such as in designated memory cells and/or at designated addresses. The interface may comprise a wireless transceiver, e.g. configured for wireless communication at frequencies in the range from 2.4 to 2.5 GHz. The interface may comprise one or more connectors for connection to another device, e.g. a fitting device. A connector may be a standard connector, such as a USB connector (USB 2.0 standard-A, USB 2.0 standard-B, Micro-A USB, Micro-B USB, Mini-A USB, Mini-B USB or others). A connector may be a proprietary connector used by a manufacturer of personal electronic devices. The interface may be configured for communication, such as wireless communication, with a hearing device comprising a wireless transceiver.

The client device certificate may comprise a certificate type identifier. The certificate type identifier may indicate a type of the certificate amongst a variety of certificate types, such as a hearing device family certificate type, a hearing device certificate type, a firmware certificate type, a research and development certificate type, and/or a client device certificate type. The certificate type identifier may be used by a hearing device and/or the client device to identify what type of certificate a hearing device receives, stores, authenticates and/or retrieves. The client device certificate may comprise a version identifier indicative of a data format version of the certificate. A hearing device may use the certificate type identifier and/or the version identifier of the client device certificate to determine what type of data the client device certificate comprises and/or what type of data is comprised in a field of the client device certificate. For example, a hearing device may determine based on the certificate type identifier and/or version identifier what field of the client device certificate comprises a digital signature and/or which public key is needed to verify the digital signature of the client device certificate. It may be envisaged that there is a one-to-one mapping between the certificate type identifier and the public-private key pair.

The client device certificate may comprise a signing device identifier. The signing device identifier refers to a unique identifier identifying the device that has signed the client device certificate, such as a manufacturing device, e.g. an integrated circuit card, a smart card, a hardware security module. The signing device identifier may for example comprise a medium access control, MAC, address of the signing device and/or a serial number of the signing device. The signing device identifier may allow for example a hearing device to determine whether the signing device is e.g. black-listed or not, and thus to reject certificates signed by a signing device that has been black-listed, e.g. due to theft or other corruption.

The client device certificate may comprise a client device type identifier. The client device type identifier may indicate a type of the client device amongst a variety of client device types, such as a model, category or type of client devices, such as a fitting type, e.g. a tablet product model, category or type for fitting the hearing device, a USB dongle product model, category or type for fitting the hearing device. The client device type identifier may be used by a hearing device to identify what type of client device the hearing device communicates with. The client device type identifier may enable a hearing device to select a set of keys from a plurality of key sets in the hearing device. Respective key sets in the hearing device may be used by respective different types of client devices.

The client device certificate may comprise a client device identifier. The client device identifier may be based on one or more hardware identifiers of one or more hardware components/modules of the client device.

The client device certificate may comprise a client device key identifier. The client device key identifier is indicative of the client device key.

The client device certificate may comprise one or more hardware identifiers, for example a first hardware identifier and/or a second hardware identifier. A hardware identifier may identify a piece of hardware comprised in the client device, such as a radio chip comprised in the client device or a digital signal processor of the client device. The hardware identifier(s) may be stored in a register of the piece of hardware comprised in the client device during manufacturing of the piece of hardware. The hardware identifier may comprise a serial number of the hardware, a chip identifier, or any combination thereof. The client device receiving or retrieving from the memory unit the client device certificate comprising the hardware identifier may verify the client device certificate by comparing its stored hardware identifier and the corresponding hardware identifier comprised in the client device certificate. Such verification may be performed upon retrieval of the client device certificate from the memory unit, such as at boot or power-on of the client device. The client device certificate may comprise one or more bluetooth addresses, e.g. assigned by the manufacturer during manufacture.

The client device certificate may comprise a user identifier, e.g. in the form of a user name. A client device certificate with a user identifier may facilitate the use of a generic device, such as a tablet computer, as a client device, e.g. by implementing a user verification/key generation/encryption at a remote server device, e.g. controlled by a hearing device manufacturer.

The client device certificate may comprise a digital signature. The digital signature enables a proof or verification of authenticity of the client device certificate, such as verification of the signer legitimacy. The digital signature is optionally generated by a manufacturing device using a client device family private key at manufacturing of the client device. The digital signature is verifiable by a hearing device and/or fitting device using a corresponding client device family public key. If the digital signature is not successfully verified using the alleged public key, a hearing device may disregard the client device certificate and/or abort normal operation. This may provide the advantage that the hearing device rejects a client device certificate that is tampered or received from unauthenticated parties. The communication with the hearing device may thus be robust against impersonation, modification and masquerading attacks.

The processing unit is configured to receive a connection response comprising a hearing device identifier via the interface. The connection response may be generated by and/or sent from a hearing device. The processing unit is configured to generate one or more keys, e.g. based on the hearing device identifier and/or the client device key. To generate one or more keys may comprise to generate a common secret based on the client device key. To generate one or more keys may comprise to generate a hearing device key based on the hearing device identifier and/or the client device key, e.g. including to perform a hash function. For example, the hearing device key, HD_KEY, may be given as:

$$HD\_KEY=\text{hash}(HD\_ID, CD\_KEY),$$

where hash is a hash function, HD_ID is the hearing device identifier and CD_KEY is the client device key.

The processing unit may be configured to obtain a session identifier, e.g. by receiving the session identifier from the hearing device. The connection response may comprise the session identifier.

To generate one or more keys may comprise to generate a common secret. The common secret may be based on the hearing device key and/or the session identifier. The common secret may be based on the hearing device identifier. The hearing device key and/or the client device key may be used as a common secret. For example, the common secret, CS, may be given as:

$$CS=\text{hash}(HD\_KEY, S\_ID),$$

where hash is a hash function, HD_KEY is the hearing device key and S_ID is the session identifier.

By generating and/or using a common secret, a need for exchanging keys is avoided. Further, if the common secret is based on the hearing device identifier (client device key is different from hearing device key), the client device key cannot be derived from the hearing device key used by the hearing device. Thereby the risk of compromising the client device key is heavily reduced.

The one or more keys generated based on the hearing device identifier and/or the client device key may be based on the common secret.

The certificate key may be based on the common secret and/or a certificate value. The certificate value may be a predefined value or string, such as "certificate". The certificate key may be generated by performing a hash function on the common secret and/or the certificate value. For example, the certificate key, C_KEY, may be given as:

$$C\_KEY=\text{hash}(CS, C\_VAL),$$

where hash is a hash function, CS is the common secret and C_VAL is the certificate value.

To generate one or more keys may comprise to generate a session key. The session may be different from the certificate key. The session key may be based on the hearing device identifier. The session key may be based on the session identifier. The session key may be based on the client device key. The processing unit may be configured to transmit the session key to a fitting device. The client device, when configured to operate as a fitting device, may be configured to perform fitting communication with the hearing device based on the session key. The session key may be based on the common secret and/or a session value. The session value may be a predefined value or string, such as "session". The session key may be generated by performing a hash function on the common secret and/or the session value. For example, the session key, S_KEY, may be given as:

$$S\_KEY=\text{hash}(CS, S\_VAL),$$

where hash is a hash function, CS is the common secret and S_VAL is the session value. By generating a session key based on a session identifier and a common secret, session specific communication is enabled.

The processing unit is configured to obtain an authentication message based on the certificate key and/or the client device certificate. To obtain the authentication message may comprise to include the client device certificate in the authentication message.

The processing unit may be configured to include an authentication key identifier, e.g. indicative of the client device key in the authentication message. The authentication key identifier may be indicative of or match the client device key identifier of the client device certificate. An authentication message comprising an authentication key identifier indicative of the client device key enables a hearing device to select a correct hearing device key from a plurality of hearing device keys, e.g. in order to generate or select the common secret. Subsequently, the hearing device may generate the certificate key for decrypting the encrypted client device certificate in the hearing device.

The processing unit may be configured to include an authentication type identifier in the authentication message. The authentication type identifier may be indicative of or match the client device type identifier and/or the certificate type identifier of the client device certificate. An authentication message comprising an authentication type identifier may enable a hearing device to select a hearing device key from a selected set of hearing device keys when the hearing device comprises a plurality of hearing device key sets. In addition or alternatively, the hearing device may be configured to process the authentication message in different ways based on the authentication type identifier. Thus, a hearing device may be able to select an appropriate authentication message processing scheme.

The method comprises receiving a connection response, e.g. from a hearing device, via the interface. The connection response may comprise a hearing device identifier.

The method comprises generating and/or obtaining one or more keys, e.g. based on the hearing device identifier and/or the client device key. Generating one or more keys may comprise to generate a common secret based on the client device key. The one or more keys may comprise a certificate key.

The method comprises generating and/or obtaining an authentication message based on the certificate key and/or the client device certificate. Obtaining and/or generating the authentication message may comprise generating an encrypted client device certificate with the client device by encrypting the client device certificate with the certificate key and optionally including the encrypted client device certificate in the authentication message. Obtaining and/or generating the authentication message may comprise obtaining an encrypted client device certificate, e.g. from the memory unit and/or a server device. Obtaining an encrypted client device certificate may comprise transmitting a certificate request to a server device. In response, the server device generates and transmits a certificate response comprising the encrypted client device certificate (the client device certificate has been encrypted with certificate key). The client device receives the certificate response with the encrypted client device certificate and includes the encrypted client device certificate in the authentication message. Thus, obtaining an encrypted client device certificate may comprise receiving a certificate response comprising the encrypted client device certificate from a server device. Obtaining the authentication message may comprise including the client device certificate in the authentication message.

The method comprises transmitting the authentication message, e.g. to the hearing device, via the interface.

The method may comprise obtaining a session identifier, e.g. by receiving the session identifier from the hearing device. The connection response may comprise the session identifier. Generating one or more keys may comprise generating a hearing device key based on the hearing device identifier and the client device key. For example, the hearing device key, HD_KEY, may be given as:

$$HD\_KEY = hash(HD\_ID, CD\_KEY),$$

where hash is a hash function, HD_ID is the hearing device identifier and CD_KEY is the client device key.

Generating one or more keys may comprise generating a common secret. The common secret may be based on the hearing device key and/or the session identifier. The common secret may be based on the hearing device identifier. The hearing device key and/or the client device key may be used as a common secret. For example, the common secret, CS, may be given as:

$$CS = hash(HD\_KEY, S\_ID),$$

where hash is a hash function, HD_KEY is the hearing device key and S_ID is the session identifier. Generating one or more keys may comprise generating one or more keys based on the common secret.

In the method, the certificate key may be based on the common secret and/or a certificate value. The certificate value may be a predefined value or string, such as "certificate". Generating the certificate key may comprise performing a hash function on the common secret and/or the certificate value. For example, the certificate key, C_KEY, may be given as:

$$C\_KEY = hash(CS, C\_VAL),$$

where hash is a hash function, CS is the common secret and C_VAL is the certificate value.

Generating one or more keys may comprise generating a session key. The session key may be different from the certificate key. The session key may be based on the hearing device identifier. The session key may be based on the session identifier. The session key may be based on the client device key. The method may comprise transmitting the session key to a fitting device. The method may comprise performing fitting communication with the hearing device based on the session key.

In the method, the session key may be based on the common secret and/or a session value. The session value may be a predefined value or string, such as "session". Generating the session key may comprise performing a hash function on the common secret and/or the session value. For example, the session key, S_KEY, may be given as:

$$S\_KEY = hash(CS, S\_VAL),$$

where hash is a hash function, CS is the common secret and S_VAL is the session value. By generating a session key based on a session identifier and a common secret, session specific communication is enabled.

Communication with a hearing device based on a common secret unique for the hearing device (e.g. common secret is based on hearing device identifier and/or session identifier) provides hearing device-specific communication. Thereby other hearing devices/listeners are not able to process/understand/eavesdrop authentication messages intended for a specific hearing device.

In the method, generating the authentication message may comprise including an authentication key identifier in the authentication message. The authentication key identifier may be indicative of or match the client device key identifier of the client device certificate. An authentication message comprising an authentication key identifier indicative of the client device key enables a hearing device to select a correct hearing device key from a plurality of hearing device keys, e.g. in order to generate or select the common secret. Subsequently, the hearing device may generate the certificate key for decrypting the encrypted client device certificate in the hearing device, e.g. based on the selected hearing device key.

In the method, generating the authentication message may comprise including an authentication type identifier in the authentication message. The authentication type identifier may be indicative of or match the client device type identifier and/or the certificate type identifier of the client device certificate. An authentication message comprising an authentication type identifier may enable a hearing device to select a hearing device key from a selected set of hearing device keys when the hearing device comprises a plurality of hearing device key sets. In addition or alternatively, the hearing device may be configured to process the authentication message in different ways based on the authentication type identifier. Thus, a hearing device may be able to select an appropriate authentication message processing scheme based on the authentication type identifier. The authentication type identifier may be the client device type identifier of the client device certificate.

In an exemplary method or an exemplary client device, the common secret, CS, may be given as:

$$CS = hash(CD\_KEY, S\_ID),$$

where hash is a hash function, CD_KEY is the client device key and S_ID is the session identifier.

FIG. 1 schematically illustrates an exemplary architecture according to this disclosure with exemplary devices that may be used for manufacturing, maintenance, and/or operating a hearing device 2. FIG. 1 shows an exemplary system 1 and a hearing device 2. The system 1 may comprise one or more of a manufacturing device 12, a client device 10, and a server device 16 for manufacturing, maintenance, and/or operating the hearing device 2 in connection with hearing loss compensation (such as for fitting the hearing device and/or for updating a hearing device parameter).

The client device 10 may be configured to perform any acts of the method disclosed herein. The client device 10 may comprise processing elements (such as a processor and a memory) configured to perform any of the steps of the method disclosed herein. The hearing device 2 may be configured to compensate for hearing loss of a user of the hearing device 2. The hearing device 2 may be configured to communicate with the client device 10 using e.g. a communication link 21, such as a uni or bi-directional communication link. The communication link 21 may be a wired link and/or wireless communication link. The communication link 21 may be a single hop communication link or a multi-hop communication link. The wireless communication link may be carried over a short-range communication system, such as Bluetooth, Bluetooth low energy, IEEE 802.11, Zigbee. The hearing device 2 may be configured to receive a hearing device certificate from the manufacturing device 12 via communication link 23 and to store the hearing device certificate in a memory unit comprised in the hearing device 2. Alternatively or additionally, the manufacturing device 12 may store the hearing device certificate in the memory unit of the hearing device. The hearing device 2 may configured to connect to the client device 10 over a network. The client device 10 may permit remote fitting of the hearing device 2, where a dispenser connects to the hearing device via the client device 10. The client device 10 may comprise a computing device acting as a client, such as a fitting device 14 (e.g. a handheld device, a relay, a tablet, a personal computer, a mobile phone, and/or USB dongle plugged in a personal computer). The client device 10 may be configured to communicate with the server device 16 via a communication link 24, such as a bidirectional communication link. The communication link 24 may be a wired link and/or wireless communication link. The communication link 24 may comprise a network, such as the Internet. The client device 10 may be configured to communicate with the server device 16 for maintenance, and update purposes. The server device 16 may comprise a computing device configured to act as a server, i.e. to serve requests from the client device 10 and/or from the hearing device 2. The server device 16 may be controlled by the hearing device manufacturer. The server device 16 may be configured to communicate with the manufacturing device 12 via a communication link 22 for manufacturing maintenance, and/or operational purposes. The server device 16 and the manufacturing device 12 may be co-located and/or form one entity for manufacturing maintenance, and/or operational purposes of the hearing device 2.

Figure 2:
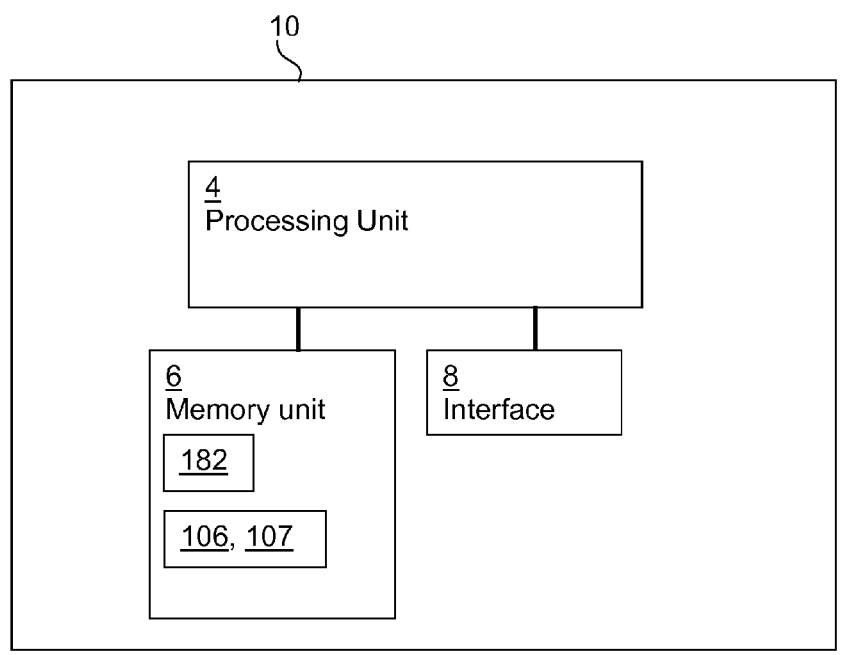

FIG. 2 schematically illustrates an exemplary client device 10. The client device 10 comprises a processing unit 4, a memory unit 6 and an interface 8. The interface 8 comprises a wireless transceiver, e.g. configured for wireless communication at frequencies in the range from 2.4 to 2.5 GHz. The interface 8 is configured for communication, such as wired and/or wireless communication, with a hearing device 2 and/or a server device. The memory unit 6 has a client device key 182 and a client device certificate 106, 107 stored thereon. The processing unit 4 is configured to receive a connection response comprising a hearing device identifier via the interface 8 and optionally to obtain a session identifier, e.g. as part of the connection response. A connection response including both the session identifier and the hearing device identifier reduces the risk of intervention from an attacker. Further, the number of connection responses from a hearing device is reduced, thereby reducing power consumption in the hearing device. The processing unit 4 is configured to generate one or more keys including a certificate key based on the hearing device identifier and/or the session identifier. The processing unit 4 is configured to generate one or more keys including a certificate key optionally based on the client device key. In the illustrated client device 10, the certificate key is generated by performing one or more hash functions. For example, the certificate key, C_KEY, may be given as:

$$C\_KEY = \text{hash}(CS, C\_VAL),$$

where hash is a hash function, CS is a common secret and C_VAL is a certificate value, e.g. a predefined value or string, such as "certificate". In the exemplary client device 10, the common secret, CS, is based on the hearing device key and the session identifier, e.g. given as:

$$CS = \text{hash}(HD\_KEY, S\_ID),$$

where hash is a hash function, HD_KEY is the hearing device key and S_ID is the session identifier. The hearing device key, HD_KEY, is based on the hearing device identifier and the client device key, e.g. given as $$HD\_KEY = \text{hash}(HD\_ID, CD\_KEY),$$

where hash is a hash function, HD_ID is the hearing device identifier and CD_KEY is the client device key.

The certificate value may be a predefined value or string, such as "certificate". Generating the certificate key may comprise performing a hash function on the common secret and/or the certificate value. For example, the certificate key, C_KEY, may be given as:

$$C\_KEY = \text{hash}(CS, C\_VAL),$$

where hash is a hash function, CS is the common secret and C_VAL is the certificate value.

The processing unit 4 is configured to obtain an authentication message based on the certificate key and the client device certificate. To obtain the authentication message comprises to generate an encrypted client device certificate by encrypting the client device certificate with the certificate key and to include the encrypted client device certificate in the authentication message. To obtain the authentication message comprises to include an authentication key identifier and/or an authentication type identifier in the authentication message. The authentication key identifier is a copy of or at least indicative of the client device key identifier. The authentication type identifier is a copy of or at least indicative of the client device type identifier. The use of authentication identifier(s), such as authentication key identifier and/or authentication type identifier in the authentication message enables a hearing device to select the correct keying material for decrypting the encrypted client device certificate and/or check whether the authentication message is generated by an outdated client device. Further, the processing unit 4 is configured to transmit the authentication message to the hearing device via the interface 8.

In the exemplary processing unit 4, to generate one or more keys comprises to generate a session key based on the hearing device identifier, the session identifier and the client device key, and wherein the processing unit is optionally configured to transmit the session key to a fitting device. When the client device 10 comprises the fitting device, the session key is used for data communication with the hearing device.

Figure 3:
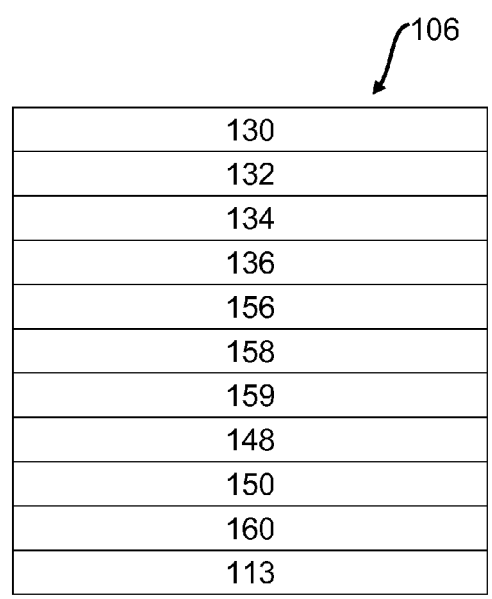

FIG. 3 schematically illustrates an exemplary client device certificate 106. The client device certificate 106 comprises a client device identifier 158 and a client device key identifier 159. The client device identifier 158 enables a hearing device to check if the client device has been blacklisted. The client device key identifier 159 is indicative of the client device key (stored in the memory unit) used for generating the certificate key. The client device key identifier 159 of the client device certificate enables a hearing device to check the validity of the authentication key identifier of the authentication message.

The client device certificate 106 comprises a digital signature 113 and/or a MAC. The digital signature 113 enables a proof or verification of authenticity of the client device certificate 106, such as verification of the signer legitimacy (e.g. whether the signer is a legitimate manufacturing device). The digital signature 113 is generated during manufacture, e.g. using a device family private key during manufacturing of the client device. The client device 10 or the processing unit 4 may verify the digital signature 113 when receiving the client device certificate 100 comprising the digital signature 113. The digital signature 113 is verifiable by the client device 10 and/or a hearing device using a corresponding device family public key, e.g. selected according to the certificate type identifier. If the digital signature 113 is not successfully verified using the alleged public key, the client device 10 may abort normal operation.

The client device certificate 106 comprises a certificate type identifier 130. The certificate type identifier 130 indicates that the client device certificate 106 is a client device certificate, e.g. selected amongst a variety of certificate types, such as a hearing device family certificate type, a hearing device certificate type, a firmware certificate type, an access right certificate type, and a client device certificate type. The certificate type identifier 130 may be used to enable a hearing device 2 to identify what type of certificate it receives, stores, authenticates and/or retrieves. The client device certificate 106 may comprise a version identifier 132 which indicates a data format version of the client device certificate 106. A hearing device 2 may use the certificate type identifier 130 and/or the version identifier 132 to determine what type of data the client device certificate 106 comprises and/or what type of data is comprised in a field of the client device certificate 106. For example, a hearing device may determine based on the certificate type identifier 130 and/or version identifier 132 what field of the client device certificate comprises a digital signature 113, and which public key from a plurality of public keys is to be used to verify the digital signature 113. It may be envisaged that there is a one-to-one mapping between the certificate type identifier 130 and the public-private key pair used for generating the digital signature 113. The hearing device certificate 106 may comprise a length identifier 134 that indicates the length of the client device certificate 106.

The client device certificate 106 optionally comprises a signing device identifier 136. The signing device identifier 136 refers to a unique identifier identifying the device (such as a an integrated circuit card, a smart card, a hardware security module comprised in or connected to a manufacturing device) that has signed the client device certificate 106. The signing device identifier 136 may for example comprise a medium access control, MAC, address of the signing device and/or a serial number. The signing device identifier 136 allows for example a hearing device 2 to determine whether the signing device of the client device certificate is e.g. black-listed or not, and thus to reject client device certificates 106 signed by a signing device that is black-listed.

The client device certificate 106 optionally comprises one or more hardware identifiers including a first hardware identifier 148 and/or a second hardware identifier 150. The hardware identifiers 148, 150 may respectively identify a piece of hardware comprised in the client device 10, such as a processing unit 4 or a radio chip comprised in the interface 4. The first hardware identifier 148 and/or the second hardware identifier 150 may also be stored in a register of the piece of hardware comprised in the client device 10 during manufacturing of the piece of hardware. The first hardware identifier 148 and/or the second hardware identifier 150 may comprise a serial number, a medium access control, MAC, address, a chip identifier, or any combination thereof. For example, the first hardware identifier 148 may provide a first client device specific value present in a register of a hardware module (e.g. the processing unit or the radio chip) of the client device 10 while the second hardware identifier may provide a second client device specific value present in a register of a hardware module of the client device 10.

The client device certificate 106 comprises a client device type identifier. 156. The client device type identifier 156 indicates a type of the client device amongst a variety of client device types, such as a model, category or type of client devices, such as a fitting type, e.g. a tablet product model, category or type for fitting the hearing device, a USB dongle product model, category or type for fitting the hearing device. Optionally, the client device certificate 106 comprises a bluetooth address 160 or at least part thereof, e.g. assigned by the manufacturer during manufacture. Addition of one or more fields and/or identifiers to the client device certificate is contemplated e.g. for a second generation client device certificate.

Figure 4:
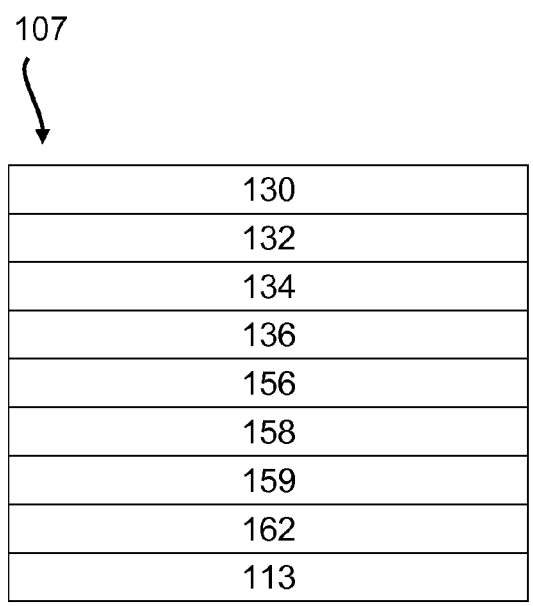

FIG. 4 schematically illustrates an exemplary client device certificate 107. The client device certificate 107 comprises certificate type identifier 130, optional version identifier 132, optional length identifier 134 and optional signing device identifier 136 as described above for client device certificate 106. The client device certificate 107 comprises client device type identifier 156, client device identifier 158, client device key identifier 159, and a user identifier 162. The user identifier 162 may be a in the form of a user name. Client device certificate 107 with a user identifier 162 may facilitate the use of a generic device, such as a tablet computer, as a client device, e.g. by implementing a user verification/key generation/certificate encryption/decryption at a remote server device, such as server device 16 controlled by hearing device manufacturer.

Figure 5:
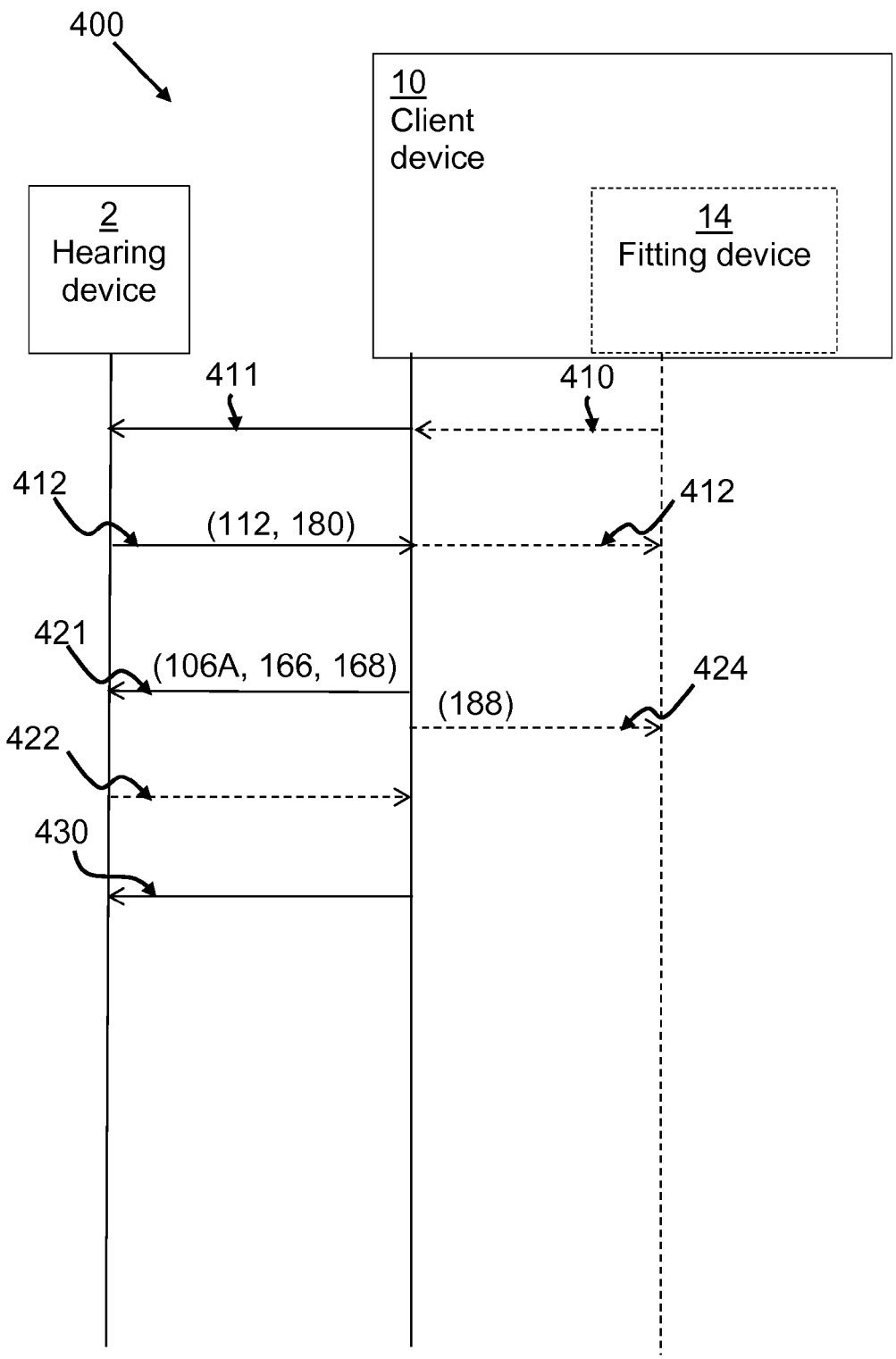

FIG. 5 schematically illustrates an exemplary signalling diagram 400 involving a hearing device 2 and a client device 10. The client device 10 may comprise a fitting device 14 or be connected to a fitting device 14. The client device 10 transmits a connection request or message 411 to hearing device 2. When the client device 10 comprises a fitting device 14, the fitting device 14 may generate a connection request 410, which is transmitted by the client device 10 as connection request 411. When the client device 10 is connected to a fitting device 14, the fitting device 14 may generate a connection request 410, which is forwarded by the client device 10 as connection request 411. The hearing device 2 returns a connection response 412 which is received by the client device 10. The client device 10 may forward the connection response 412 to the fitting device 14. The connection response 412 comprises a hearing device identifier 112 and/or a session identifier 180. The client device 10 generates one or more keys including a certificate key based on the hearing device identifier 112 and/or session identifier 180 received in the connection response and the client device key 182 stored in the memory unit. The client device 10 obtains and transmits authentication message 421 to the hearing device 2 based on the certificate key and the client device certificate 106. The authentication message 421 comprises encrypted client device certificate 106A. The encrypted client device certificate 106A is generated by encrypting the client device certificate 106 with the certificate key. The authentication message 421 comprises an authentication key identifier 166 indicative of the client device key 182 and/or authentication type identifier 168 indicative of the client device type identifier 156. Upon successful authentication of the authentication message 421 and/or verification, the client device 10 may receive an authentication response 422 from the hearing device 2. The client device 10 may forward the authentication response 422 to fitting device 14. The communication channel is now open and secure. The client device 10 or fitting device 14 via the client device 10 may send hearing device data 430 to the hearing device 2. Hearing device data 430 may comprise one or more of firmware, fitting data, and/or hearing device operating parameters. Fitting data may for example be data generated by a fitting device 14 used by a dispenser when a hearing device 2 is being fitted. Fitting data may comprise hearing loss parameters, compressor parameters, filter coefficients, and/or gain coefficients. Hearing device operation parameters may comprise volume control parameters, mode and/or program control parameters. Firmware may refer to a computer program provided by the hearing device manufacturer, and to be installed on the hearing device 2 to control the hearing device 2. Firmware is for example to be installed to upgrade the operations and capabilities of the hearing device 2. The client device 10 may transmit an authentication message 424 comprising a session key 188 to the fitting device 14. The session key may be used for secure data communication 430 with the hearing device 2

Figure 6:
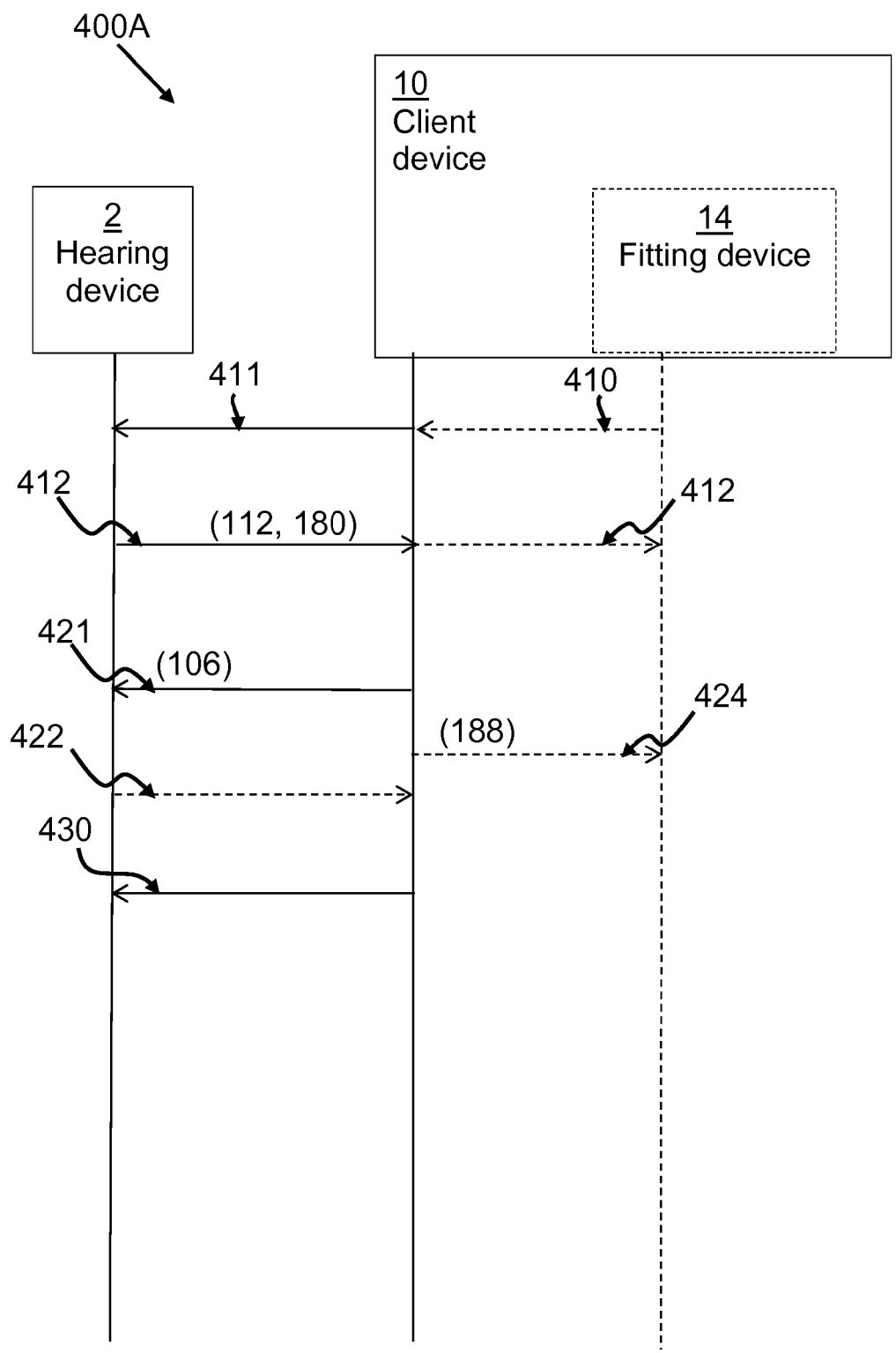

FIG. 6 schematically illustrates an exemplary signalling diagram 400A where the client device certificate 106 is included in the authentication message 421.

Figure 7:
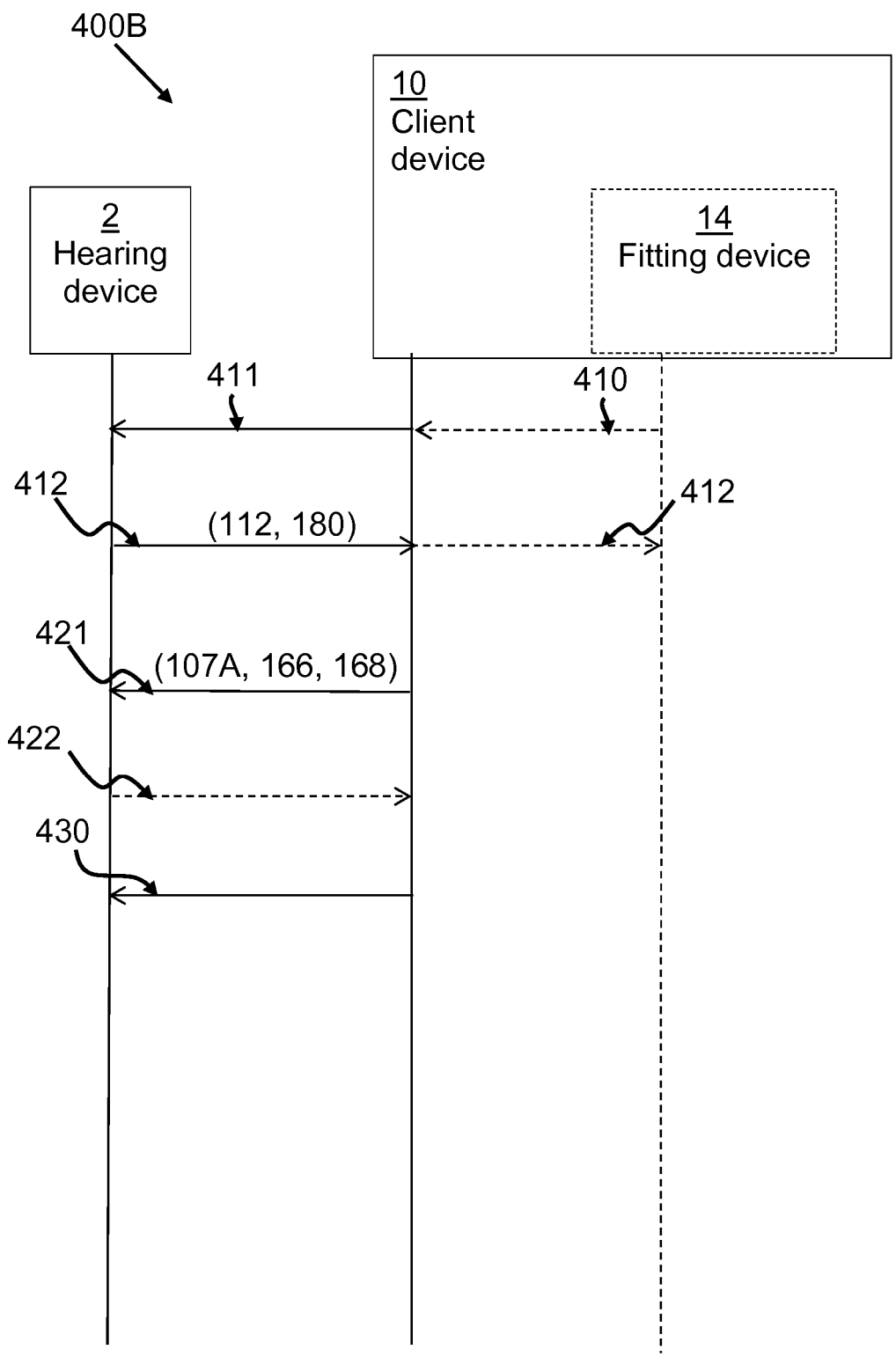

FIG. 7 schematically illustrates an exemplary signalling diagram 400B where the encrypted client device certificate 107A is included in the authentication message 421.

Figure 8:
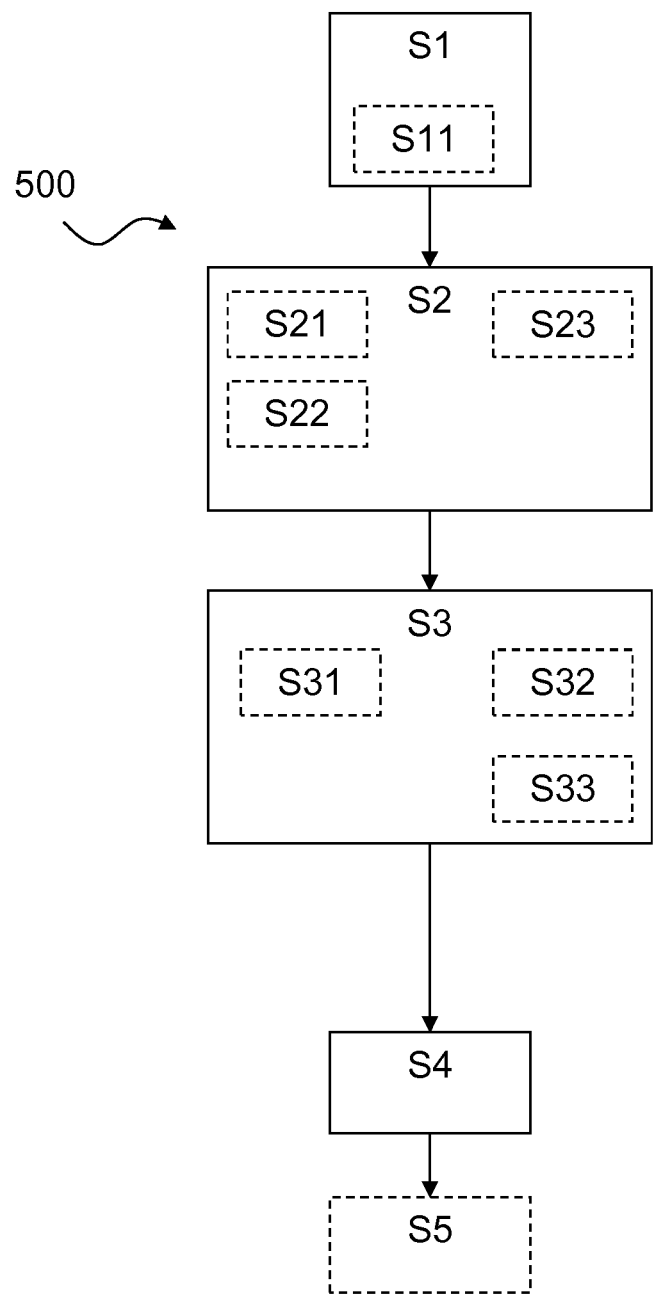

FIG. 8 schematically illustrates a flowchart of an exemplary method 500 of operating a client device for hearing device communication. The client device comprises a memory unit having a client device key and a client device certificate stored thereon. The method comprises receiving S1 a connection response comprising a hearing device identifier via the interface; generating S2 one or more keys including a certificate key based on the hearing device identifier and the client device key; obtaining S3 an authentication message based on the certificate key and the client device certificate; and transmitting S4 the authentication message via the interface. Obtaining S3 the authentication message comprises generating S31 an encrypted client device certificate by encrypting the client device certificate with the certificate key and including the encrypted client device certificate in the authentication message. The method 500 comprises obtaining S11 a session identifier as part of the connection response. Generating S2 one or more keys comprises generating S21 a hearing device key based on the hearing device identifier and the client device key, and generating S22 a common secret based on the hearing device key and the session identifier. The certificate key is based on the common secret and a certificate value. Generating S2 one or more keys optionally comprises generating S23 a session key based on the hearing device identifier, the session identifier and the client device key. The method may comprise transmitting S5 the session key to a fitting device. In the method 500, the session key is based on the common secret and a session value. Obtaining S3 the authentication message comprises including S32 an authentication key identifier indicative of the client device key in the authentication message and/or including S33 an authentication type identifier in the authentication message.

Figure 9:
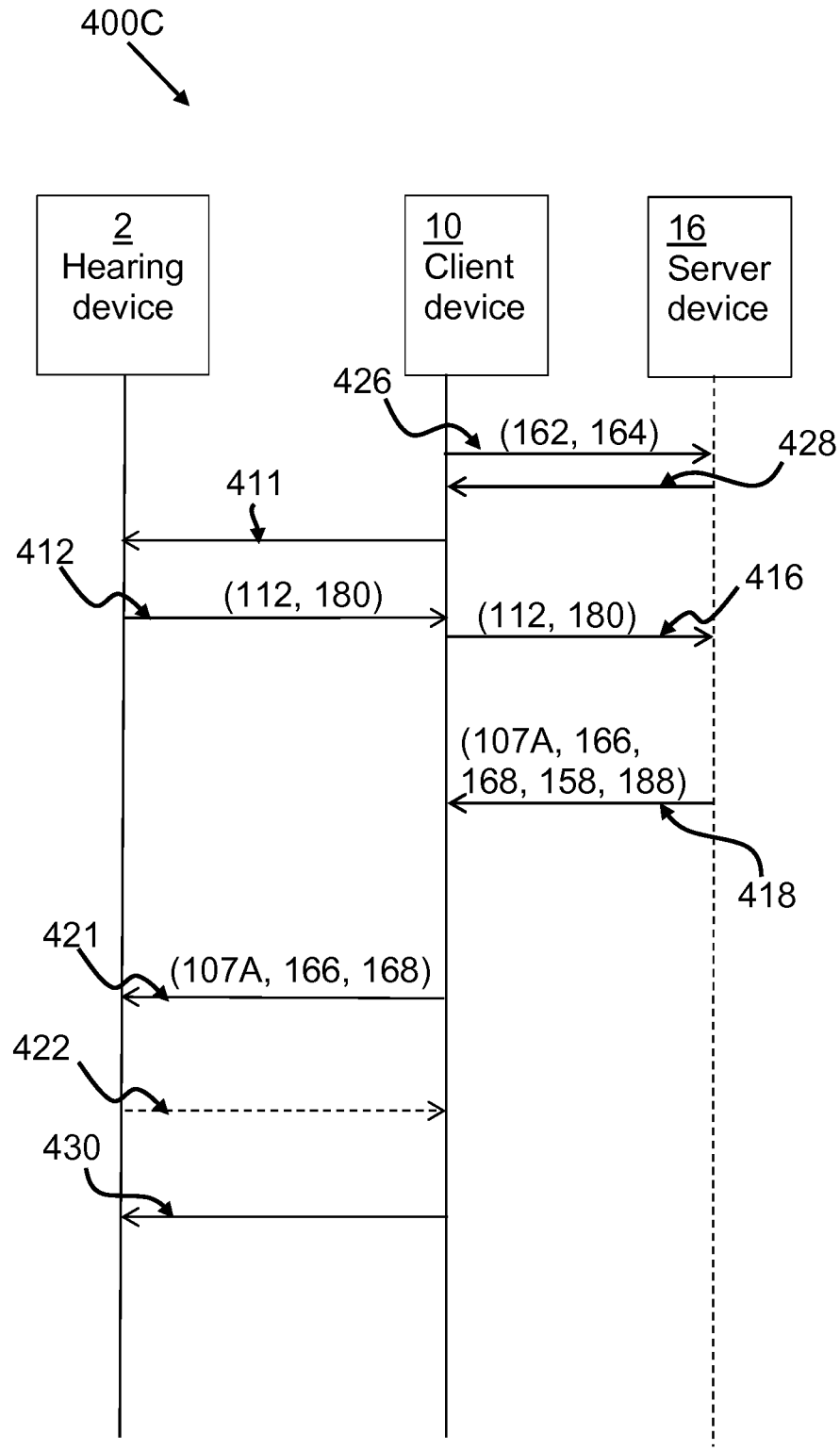

FIG. 9 schematically illustrates an exemplary signalling diagram 400C where obtaining the authentication message comprises obtaining an encrypted client device certificate from a server device. The client device 10 transmits a certificate request 416 to a server device 16. The certificate request 416 comprises the hearing device identifier 112 and the session identifier 180. The server device 16 obtains the client device certificate 107 from a memory unit thereof, calculates certificate key and session key based on the hearing device identifier 112 and the session identifier 180 and encrypts the client device certificate 107. The server device generates and transmits certificate response 418 to the client device 10. The certificate response 418 includes encrypted client device certificate 107A, authentication type identifier 168, authentication key identifier 166, client device identifier 158 and session key 188. The client device receives the certificate response 418 with the encrypted client device certificate 107A and includes the encrypted client device certificate in the authentication message. Thus, obtaining an encrypted client device certificate may comprise receiving a certificate response comprising the encrypted client device certificate from a server device. Optionally, the client device may, as illustrated in FIG. 9 be configured to perform a login procedure comprising transmitting a login request 426 comprising user identifier 162 and password 164. The server device 16 verifies the login request 426 and returns with login response 428 upon accept.

Exemplary client devices and methods are set out in the following items.

Item 1. A client device for hearing device communication, the client device comprising
a processing unit;
a memory unit; and
an interface,
the memory unit having a client device key and a client device certificate stored thereon, wherein the processing unit is configured to
receive a connection response comprising a hearing device identifier via the interface;
generate one or more keys including a certificate key based on the hearing device identifier and the client device key;
obtain an authentication message based on the certificate key and the client device certificate, wherein to obtain the authentication message comprises to generate an encrypted client device certificate by encrypting the client device certificate with the certificate key and to include the encrypted client device certificate in the authentication message; and
transmit the authentication message via the interface.

Item 2. Client device according to item 1, wherein the processing unit is configured to obtain a session identifier, and wherein to generate one or more keys comprises to generate a hearing device key based on the hearing device identifier and the client device key, and to generate a common secret based on the hearing device key and the session identifier.

Item 3. Client device according to item 2, wherein the certificate key is based on the common secret and a certificate value.

Item 4. Client device according to any of items 2-3, wherein to generate one or more keys comprises to generate a session key based on the hearing device identifier, the session identifier and the client device key, and wherein the processing unit is configured to transmit the session key to a fitting device.

Item 5. Client device according to item 4, wherein the session key is based on the common secret and a session value.

Item 6. Client device according to any of items 1-5, wherein the processing unit is configured to include an authentication key identifier indicative of the client device key in the authentication message Item 7. Client device according to any of items 1-6, wherein the processing unit is configured to include an authentication type identifier in the authentication message.

Item 8. Client device according to any of items 1-7, wherein the client device certificate comprises one or more of:
- a certificate type identifier;
- a signing device identifier
- a client device type identifier;
- a client device identifier;
- a client device key identifier;
- one or more hardware identifiers; and
- a digital signature.

Item 9. Method of operating a client device for hearing device communication, the client device comprising a memory unit having a client device key and a client device certificate stored thereon, the method comprising:
receiving a connection response comprising a hearing device identifier via the interface;
generating one or more keys including a certificate key based on the hearing device identifier and the client device key;
obtaining an authentication message based on the certificate key and the client device certificate, wherein obtaining the authentication message comprises generating an encrypted client device certificate by encrypting the client device certificate with the certificate key and including the encrypted client device certificate in the authentication message; and
transmitting the authentication message via the interface.

Item 10. Method according to item 9, the method comprising obtaining a session identifier, and wherein generating one or more keys comprises generating a hearing device key based on the hearing device identifier and the client device key, and generating a common secret based on the hearing device key and the session identifier.

Item 11. Method according to item 10, wherein the certificate key is based on the common secret and a certificate value.

Item 12. Method according to any of items 10-11, wherein generating one or more keys comprises generating a session key based on the hearing device identifier, the session identifier and the client device key, and wherein the method comprises transmitting the session key to a fitting device.

Item 13. Method according to item 12, wherein the session key is based on the common secret and a session value.

Item 14. Method according to any of items 9-13, wherein obtaining the authentication message comprises including an authentication key identifier indicative of the client device key in the authentication message.

Item 15. Method according to any of items 9-14, wherein obtaining the authentication message comprises including an authentication type identifier in the authentication message.

Item 16. Method according to any of items 9-15, wherein the client device certificate comprises one or more of:
- a certificate type identifier;
- a signing device identifier
- a client device type identifier;
- a client device identifier;
- a client device key identifier;
- one or more hardware identifiers; and
- a digital signature.

Although particular features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications and equivalents.

LIST OF REFERENCES 2 hearing device
4 processing unit of client device
6 memory unit of client device
8 interface of client device
10 client device
12 manufacturing device
14 fitting device
16 server device
21 communication link between client device and hearing device
22 communication link between server device and manufacturing device
23 communication link between hearing device and manufacturing device
24 communication link between server device and client device/fitting device
100 hearing device certificate
106, 107 client device certificate
106A, 107A encrypted client device certificate
112 hearing device identifier
113 digital signature
114 first hearing device key identifier
130 certificate type identifier
132 version identifier
134 length identifier
136 signing device identifier
148 first hardware identifier
150 second hardware identifier
156 client device type identifier
158 client device identifier;
159 client device key identifier
160 bluetooth address
162 user identifier
164 password
166 authentication key identifier
168 authentication type identifier
180 session identifier
182 client device key
188 session key
400, 400A, 400B, 400C signalling diagram
410, 411 connection request
412 connection response
416 certificate request
418 certificate response
421 authentication message
422 authentication response
424 authentication message
426 login request 428 login response
430 hearing device data

The invention claimed is:

1. A client device for hearing device communication, the client device comprising:
   a processing unit, wherein the processing unit comprises a processor;
   a memory unit; and
   an interface;
   wherein the memory unit has a client device key and a client device certificate stored therein; and
   wherein the processing unit is configured to
      receive a connection data comprising a hearing device identifier via the interface of the client device,
      generate one or more keys including a certificate key based on the hearing device identifier and the client device key, and
      obtain an authentication message based on the certificate key and the client device certificate;
   wherein the processing unit of the client device is configured to obtain the authentication message by encrypting the client device certificate with the certificate key to obtain an encrypted client device certificate, and including the encrypted client device certificate in the authentication message; and
   wherein the interface of the client device is configured to transmit the authentication message obtained by the processing unit for reception by the hearing device, wherein the authentication message allows the hearing device to recognize the client device as a trusted source due to the authentication message being based on both the client device key and the hearing device identifier.

2. The client device according to claim 1, wherein the one or more keys comprise a hearing device key;
   wherein the processing unit is configured to obtain a session identifier;
   wherein the processing unit is configured to generate the hearing device key based on the hearing device identifier and the client device key; and
   wherein the processing unit is configured to generate a common secret based on the hearing device key and the session identifier.

3. The client device according to claim 2, wherein the certificate key is based on the common secret and a certificate value.

4. The client device according to claim 2, wherein the one or more keys comprise a session key;
   wherein the processing unit is configured to generate the session key based on the hearing device identifier, the session identifier, and the client device key; and
   wherein the interface is configured to transmit the session key to a fitting device.

5. The client device according to claim 4, wherein the session key is based on the common secret and a session value.

6. The client device according to claim 1, wherein the processing unit is configured to include an authentication key identifier indicative of the client device key in the authentication message.

7. The client device according to claim 1, wherein the processing unit is configured to include an authentication type identifier in the authentication message.

8. The client device according to claim 1, wherein the client device certificate comprises:
   a certificate type identifier,
   a signing device identifier,
   a client device type identifier,
   a client device identifier,
   a client device key identifier,
   one or more hardware identifiers,
   a digital signature, or
   any combination of the foregoing.

9. A method of operating a client device for hearing device communication, the client device comprising a memory unit having a client device key and a client device certificate stored therein, the method comprising:
   receiving a connection data comprising a hearing device identifier via an interface;
   generating one or more keys including a certificate key based on the hearing device identifier and the client device key;
   obtaining an authentication message by a processing unit of the client device based on the certificate key and the client device certificate, wherein the act of obtaining the authentication message comprises generating an encrypted client device certificate by encrypting the client device certificate with the certificate key, and including the encrypted client device certificate in the authentication message; and
   transmitting the authentication message obtained by the processing unit of the client device via the interface for reception by the hearing device, wherein the authentication message allows the hearing device to recognize the client device as a trusted source due to the authentication message being based on both the client device key and the hearing device identifier.

10. The method according to claim 9, further comprising obtaining a session identifier;
   wherein the act of generating the one or more keys comprises generating a hearing device key based on the hearing device identifier and the client device key, and generating a common secret based on the hearing device key and the session identifier.

* * * * *